US008621864B2

(12) United States Patent
Osburn et al.

(10) Patent No.: US 8,621,864 B2
(45) Date of Patent: Jan. 7, 2014

(54) ENGINE EXHAUST MANIFOLD PRESSURE CONTROL OF INTAKE FLOW

(75) Inventors: Andrew W. Osburn, Nashville, IN (US); Mert Geveci, Athens, GA (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 476 days.

(21) Appl. No.: 12/891,151

(22) Filed: Sep. 27, 2010

(65) Prior Publication Data

US 2011/0154820 A1  Jun. 30, 2011

Related U.S. Application Data

(60) Provisional application No. 61/245,909, filed on Sep. 25, 2009.

(51) Int. Cl.
F02B 33/44 (2006.01)
(52) U.S. Cl.
USPC ............ 60/605.2; 60/611; 701/108; 701/109; 123/568.26
(58) Field of Classification Search
USPC ............... 60/605.2, 287, 288, 597, 600, 608; 123/568.18, 568.26; 701/108
See application file for complete search history.

(56) References Cited

U.S. PATENT DOCUMENTS

| | | | | |
|---|---|---|---|---|
| 6,035,640 | A * | 3/2000 | Kolmanovsky et al. | 60/605.2 |
| 6,305,167 | B1 * | 10/2001 | Weisman et al. | 60/602 |
| 6,408,834 | B1 | 6/2002 | Brackney et al. | |
| 6,418,719 | B2 * | 7/2002 | Terry et al. | 60/602 |
| 6,460,522 | B1 * | 10/2002 | Rimnac | 123/568.24 |
| 6,480,782 | B2 * | 11/2002 | Brackney et al. | 701/108 |
| 6,588,210 | B2 * | 7/2003 | Kreso | 60/602 |
| 6,604,361 | B2 * | 8/2003 | Buckland et al. | 60/605.2 |
| 6,625,985 | B2 | 9/2003 | Shirakawa | |
| 6,625,986 | B2 | 9/2003 | Mazaud et al. | |
| 6,672,060 | B1 * | 1/2004 | Buckland et al. | 60/602 |
| 7,031,824 | B2 * | 4/2006 | Gangopadhyay | 701/108 |
| 7,089,738 | B1 * | 8/2006 | Boewe et al. | 60/605.2 |
| 7,437,874 | B2 * | 10/2008 | Ramamurthy et al. | 60/602 |
| 7,637,107 | B2 * | 12/2009 | Ramamurthy | 60/611 |
| 7,779,633 | B2 * | 8/2010 | Roettger et al. | 60/602 |
| 7,784,451 | B2 * | 8/2010 | Chi | 123/568.19 |

(Continued)

OTHER PUBLICATIONS

J. Chauvin, "Motion Planning for Experimental Airpath Control of a Diesel HCCI Engine", Control Eng. Pract., vol. 16, p. 1081-1091, 2008.*

(Continued)

*Primary Examiner* — Thomas Denion
*Assistant Examiner* — Thomas Olszewski
(74) *Attorney, Agent, or Firm* — Krieg DeVault LLP

(57) ABSTRACT

A method for controlling charge flow in an internal combustion engine includes operating an engine having a VGT. The method includes determining a target and current charge flow and EGR flow. The method further includes determining an error term for the charge flow and the EGR flow, and determining an exhaust pressure feedback command in response to the error terms. The exhaust pressure feedback command is combined with an exhaust pressure feedforward command, and the VGT is controlled in response to the exhaust pressure feedback command. The method additionally includes determining the exhaust pressure feedback command in response to a current EGR valve position. The method further includes controlling an EGR flow rate with the EGR valve at relatively closed EGR valve positions, and controlling the EGR flow rate with exhaust pressure at relatively open EGR valve positions.

26 Claims, 7 Drawing Sheets

(56) References Cited

U.S. PATENT DOCUMENTS

| | | | |
|---|---|---|---|
| 7,848,872 B2 * | 12/2010 | Ma et al. | 701/108 |
| 8,006,494 B2 * | 8/2011 | Nagae | 60/605.2 |
| 8,103,427 B2 * | 1/2012 | Osburn et al. | 701/108 |
| 8,209,979 B2 * | 7/2012 | Wang et al. | 60/602 |
| 8,316,829 B2 * | 11/2012 | Piper et al. | 123/568.21 |
| 2003/0177766 A1 | 9/2003 | Wang et al. | |
| 2003/0192516 A1 | 10/2003 | Brunemann et al. | |
| 2008/0149078 A1 * | 6/2008 | Hill et al. | 123/568.11 |
| 2010/0131171 A1 * | 5/2010 | Muller et al. | 701/102 |
| 2010/0170244 A1 * | 7/2010 | Brooks et al. | 60/602 |
| 2012/0023932 A1 * | 2/2012 | Ge et al. | 60/602 |

OTHER PUBLICATIONS

J. Wahlstrom, "EGR-VGT Control and Tuning for Pumping Work Minimization and Emission Control," Control Sys. Tech., vol. 18, No. 4, 2010.*

J. Chauvin, "Experimental Motion Planning in Airpath Control for HCCI Engine", American Control Conference, p. 1874-1879, 2006.*

International Search Report and Written Opinion, PCT/US2010/050394, Cummins Inc., International Search Authority/KR, Jun. 22, 2011.

* cited by examiner

ENGINE EXHAUST MANIFOLD PRESSURE CONTROL OF INTAKE FLOW

CROSS REFERENCE TO RELATED APPLICATIONS

The present application claims the benefit of U.S. Provisional Patent Application 61/245,909 filed Sep. 25, 2009, and is incorporated herein by reference.

BACKGROUND

The intake flow of an internal combustion engine, including fresh air and any recirculated gases, is an important parameter to control for the engine to properly achieve targeted torque and power, and to control emissions generated by the engine. The control of the intake flow is performed by many actuators, often including an exhaust gas recirculation (EGR) valve and a variable geometry turbocharger (VGT) with a position that defines the operating characteristics of the VGT. The position of the VGT can indicate a position of one or more nozzles, vanes, or other devices associated with the turbocharger.

Known controls for intake flow include targeting a specified fresh air flow and EGR flow, and controlling the EGR valve and VGT positions to achieve the both flows and therefore the desired intake flow. The EGR valve and VGT positions are each only effective at certain operating conditions, and are highly coupled with respect to effects on the intake flow parameters. Presently available controls decouple the EGR valve and VGT position through a number of techniques to achieve targeted intake flow parameters, including operating the EGR valve and VGT positions as serial controllers, and applying a mathematical transform to decouple the EGR valve and VGT position as intake flow parameter actuators.

Presently known controllers are effective for achieving the intake parameter values—for example as described in reference U.S. Pat. No. 6,408,834 entitled "System for decoupling EGR flow and turbocharger swallowing capacity/efficiency control mechanisms." However, presently available controllers result in a system that is highly complex, that requires a great deal of effort to calibrate, and that has a coupling between the intake manifold pressure and EGR valve position and the fuel flow rate to the engine. Therefore, further technological developments are desirable in this area.

SUMMARY

One embodiment is a unique method for controlling charge flow for an engine with exhaust pressure. An additional embodiment is a unique method for controlling EGR flow with exhaust pressure when the EGR valve is relatively open, and controlling the EGR flow with the EGR valve when the EGR valve is closed or relatively closed. Other embodiments include unique methods, systems, and apparatus to control charge flow and EGR flow. Further embodiments, forms, objects, features, advantages, aspects, and benefits shall become apparent from the following description and drawings.

DESCRIPTION OF THE ILLUSTRATIVE EMBODIMENTS

Figure 1:
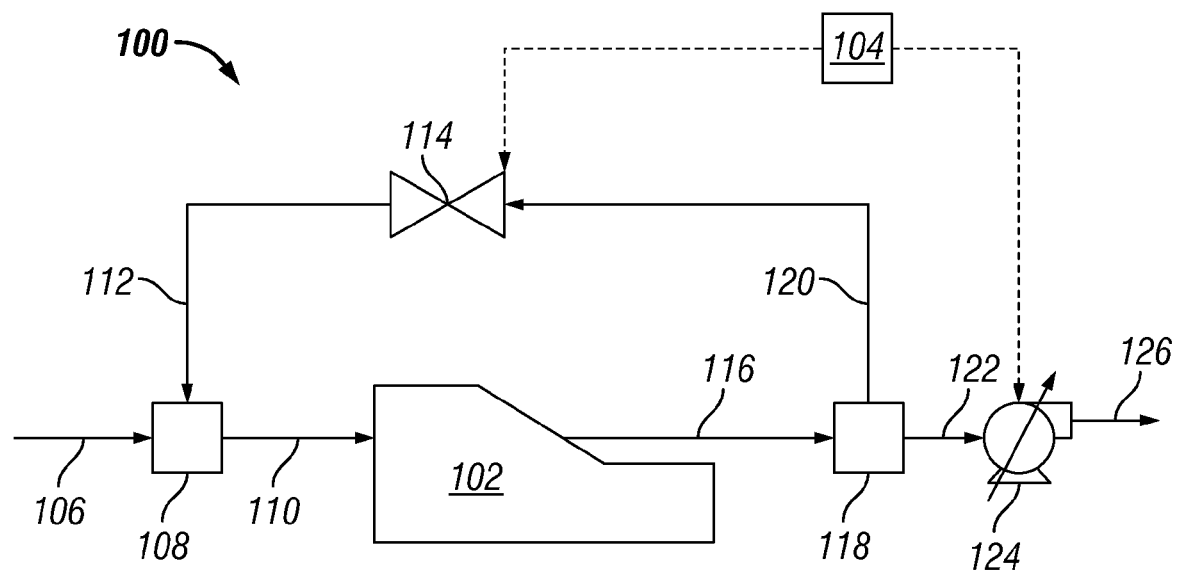
FIG. 1 is a schematic illustration of a system for controlling intake flow for an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic illustration of a system 100 for controlling intake flow for an internal combustion engine. The system 100 includes an internal combustion engine 102 that may be any type of internal combustion engine understood in the art. The engine produces a pre-EGR exhaust stream 116 and receives a charge flow 110 comprising an intake air stream 106 mixed with an exhaust gas recirculation (EGR) stream 112. The engine 102 is fluidly coupled to an intake manifold 108 and an exhaust manifold 118. The intake manifold 108 is illustrated as the position where the EGR stream 112 and the intake air stream 106 mix, but those streams may mix at any location upstream of the engine 102. The EGR stream 112 has an EGR exit stream 120 that passes through an EGR valve 114. The EGR exit stream 120 is illustrated as exiting the exhaust manifold 118, but the EGR exit stream 120 may exit at any location downstream of the engine 102 and upstream of a turbine 124.

The turbine 124 is a variable geometry turbine (VGT) 124 that is the turbine side of a turbocharger. The compressor side of the turbocharger is not shown to allow a clear description of aspects of the present application. The VGT 124 may be of any type known in the art, including at least a swing vane VGT, a sliding nozzle VGT, and an internal or external bypass VGT. The mechanism of producing the variable geometry of the VGT 124 is not important, although the VGT 124 should be a device that can modulate the pressure of the exhaust stream 122. An effluent stream 126 flows out of the system 100.

The system 100 further includes a controller 104. The controller 104 structured to perform certain operations control the intake flow of the engine 102, including the flow rate of the EGR stream 112 and the flow rate of the charge flow 110. In certain embodiments, the controller 104 forms a portion of a processing subsystem including one or more computing devices having memory, processing, and communication hardware. The controller 104 may be a single device or a distributed device, and the functions of the controller may be performed by hardware or software. More specific descriptions of an exemplary embodiment of the controller 104 are provided in the section referencing FIG. 2.

Figure 2:
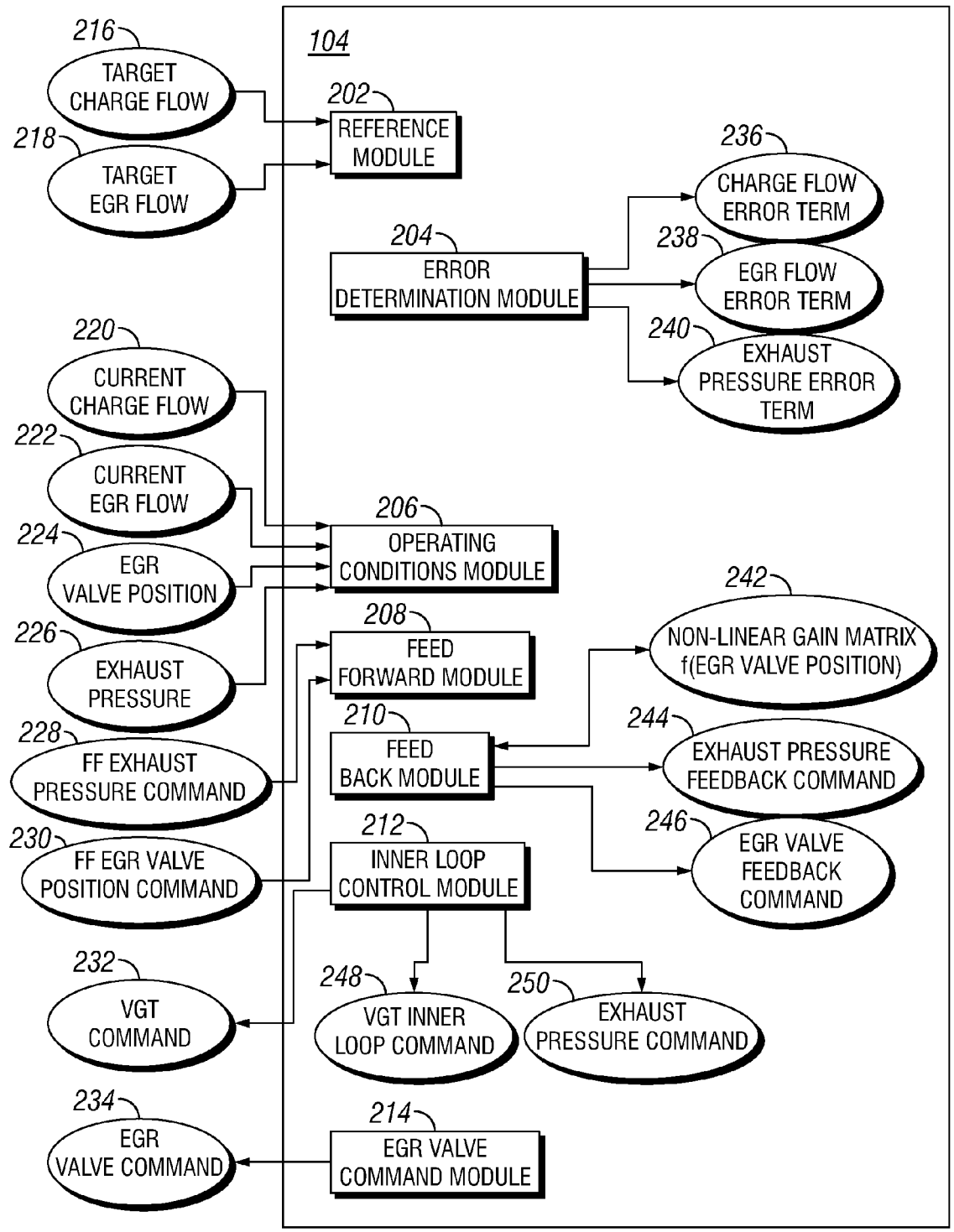
FIG. 2 is a schematic illustration of a controller for controlling intake flow for an internal combustion engine.

FIG. 2 is a schematic illustration of a controller 104 for controlling intake flow for an internal combustion engine 102. The controller 104 includes modules structured to functionally execute operations for controlling the intake flow for the engine 102. The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein.

The controller 104 includes a reference module 202 that interprets a target charge flow 216 and a target EGR flow 218. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 104 further includes an operating conditions module 206 that interprets a current charge flow 220, a current EGR flow 222, and an EGR valve position 224. Current values, as utilized herein, refer to values in close temporal relation to the operating time of the controller 104, but the current values need not be absolutely contemporaneous. For example, and without limitation, a current value may be a value from a prior execution cycle of the controller 104, a last known reliable value, a value that was most recently saved on a computer readable medium, or other value that generally represents a latest known value for the parameter which is "current."

The controller 104 further includes an error determination module 204 that determines a charge flow error term 236 in response to the current charge flow 220 and the target charge flow 216, and determines an EGR flow error term 238 in response to the target EGR flow 218 and the current EGR flow 222. The controller 104 further includes a feedback module 210 that determines an exhaust pressure feedback command 244 and an EGR valve feedback command 246 in response to the charge flow error term 236 and the EGR flow error term 238. In a further embodiment, the feedback module 210 also determines the exhaust pressure feedback command 244 and the EGR valve feedback command 246 in response to the EGR valve position 224.

In certain embodiments, the feedback module 210 utilizes an EGR valve command 234 instead of, or as a substitute for, the EGR valve position 224. For example, and without limitation, an EGR valve position 224 feedback value may not be available and the EGR valve command 234 may be utilized instead, the EGR valve may be a very responsive portion of the system 100 wherein the EGR valve command 234 provides a reliable indication of a current EGR valve position 224, and/or the controller 104 may be calibrated based on EGR valve command 234 values rather than EGR valve position 224 data. The feedback commands 244, 246 may be determined from the error terms 236, 238 according to standard PID controllers or any portion thereof (e.g. proportional-integral or integral control only), according to fuzzy logic, according to neural networks, or any other feedback control mechanism understood in the art.

The controller 104 further includes a feedforward module 208 that interprets a feedforward exhaust pressure command 228 and a feedforward EGR valve position command 230. The feedforward commands 228, 230 may be provided by stored open-loop data, according to a model of the system 100, according to default steady state values for EGR valve position and VGT position data to achieve the target charge flow 216 and target EGR flow 218, or by any other feedforward control mechanism understood in the art.

The controller 104 further includes an inner loop control module 212 that determines an exhaust pressure command 250 in response to the feedforward exhaust pressure command 228 and the exhaust pressure feedback command 244. The inner loop control module 212 may determine the exhaust pressure command 250 by adding the feedforward and feedback commands 228, 244, by weighting the commands 228, 244, and/or by using a calibrated lookup table including exhaust pressure commands 250 as a function of the feedforward exhaust pressure command 228 and the exhaust pressure feedback command 244. Any method of mixing a feedforward and feedback command known in the art is contemplated herein.

The inner loop control module 212 further provides a VGT command 232 in response to the exhaust pressure command 250. In certain embodiments, the VGT command 232 is an output of a control algorithm that utilizes the exhaust pressure command 250 as a target value, that determines an exhaust pressure error term 240 by comparing the exhaust pressure command 250 to the current exhaust pressure 226, and by applying any known control scheme to the resulting exhaust pressure error term 240. The operation to control the VGT command 232 in response to the exhaust pressure error term 240 may be implemented as an inner loop controller to an outer loop control scheme that controls the current charge flow 220 and the current EGR flow 222. Therefore, the VGT command 232 may be a VGT inner loop command 248, and/or the VGT inner loop command 248 may be a preliminary VGT command 232 subject to modification by other algorithms (not shown). In certain embodiments, the controller 104 further includes an EGR valve command module 214 that determines an EGR valve command 234 in response to the EGR valve feedback command 246 and the feedforward EGR valve position command 230.

In certain embodiments, the feedback module 210 further determines the exhaust pressure feedback command 244 and EGR valve feedback 246 command from a non-linear gain matrix 242 that includes a function of the EGR valve position 224. The EGR valve command 234, as noted previously, may be substituted for the EGR valve position 224 in certain embodiments. The non-linear gain matrix 242 enables various behaviors that may be desirable in certain embodiments dependent upon the system 100 response. The non-linear gain matrix 242 allows the system 100 to favor different control modes (e.g. EGR valve control over VGT position control) at various operating system conditions as deemed appropriate. Specific, non-limiting examples are described as follows.

In one example, an exemplary non-linear gain matrix 242 favors EGR valve control of the current EGR flow at low flow rates and/or low EGR valve positions, and exhaust pressure control of the current EGR flow at high flow rates and high EGR valve positions. In the example, the non-linear gain matrix 242 may increase the response of the EGR valve or the VGT according to the favored control mechanism, and/or reduce the response of the EGR valve or the VGT according to the control mechanism that is not favored. In another example, the non-linear gain matrix 242 favors exhaust pressure control of the current charge flow 220. In a further example, the non-linear gain matrix further favors EGR valve control of the current charge flow at high ΔP/P values, where the ΔP is a difference between the current exhaust pressure and a current intake pressure. Non-limiting examples of the ΔP value include the pressure in the exhaust manifold 118 minus the pressure in the intake manifold 108, the pressure drop across the engine, the pressure of the exhaust stream 122 minus the pressure of the charge flow 110 stream, or other similar pressure differentials. The P is the current exhaust pressure, for example in the exhaust manifold 118.

Figure 3A:
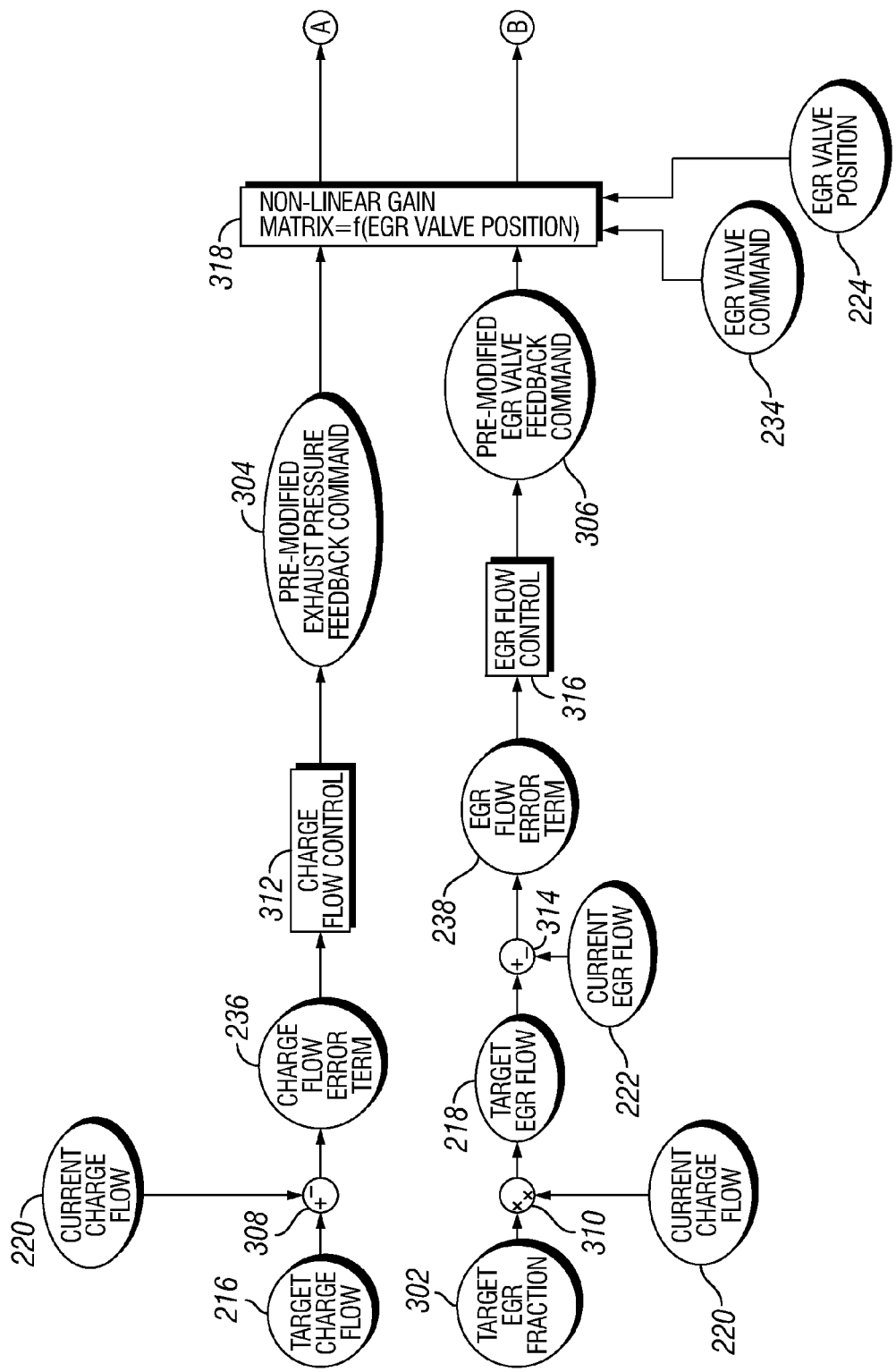
FIG. 3A is a first portion of a schematic illustration of a control loop for controlling intake flow for an internal combustion engine.
Figure 3B:
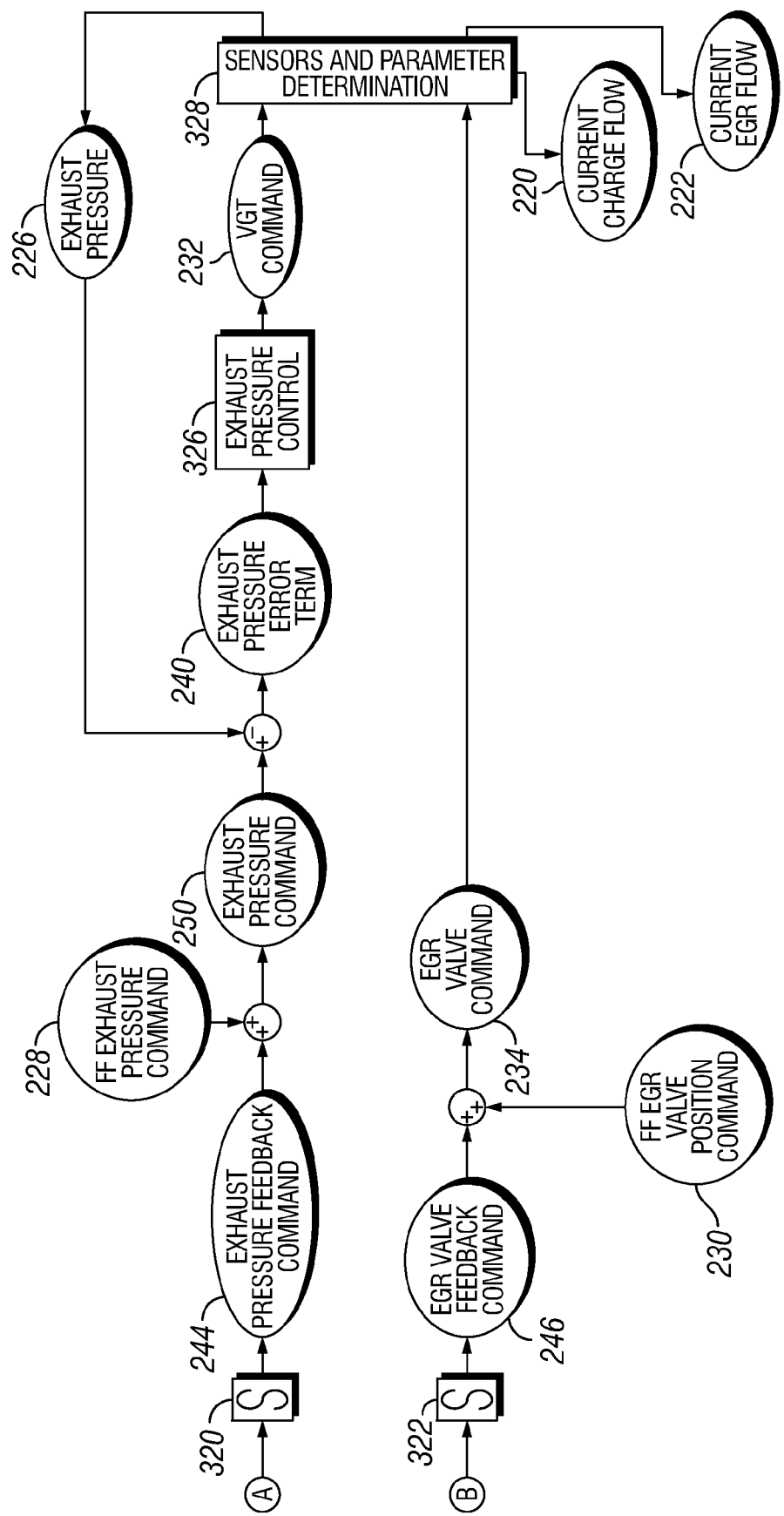
FIG. 3B is a second portion of the schematic illustration of the control loop for controlling intake flow for an internal combustion engine.

FIG. 3A and FIG. 3B combine to form a schematic illustration of a control loop for controlling intake flow for an internal combustion engine. The intake flow is the current charge flow 220, and/or a fresh air intake combined with the current EGR flow 222, or equivalent streams that together describe the amount and composition of the charge flow 220. The control loop includes receiving the target charge flow 216 and the target EGR fraction 302.

Following the top branch, a current charge flow value 220 is subtracted 308 to determine a charge flow error term 236, and a charge flow control scheme 312 determines a pre-modified exhaust pressure feedback command 304. The charge flow control scheme 312 includes any control scheme understood in the art to generate the pre-modified exhaust pressure feedback command 304 in response to the charge flow error term 236, including without limitation a PID controller, a PI controller, and/or a fuzzy logic controller.

Following the lower branch, a current charge flow value 220 is multiplied 310 by the target EGR fraction 302 to determine the target EGR flow 218. In alternate embodiments, a main engine control scheme (not shown) provides a target EGR flow 218 directly, although it is more common that the target EGR fraction 302 is requested. The current EGR flow 222 is subtracted from the target EGR flow 218 to determine an EGR flow error term 238, and an EGR flow control scheme 316 determines a pre-modified EGR valve feedback command 306. The EGR flow control scheme 316 includes any control scheme understood in the art to generate the pre-modified EGR valve feedback command 304 in response to the EGR flow error term 238, including without limitation a PID controller, a PI controller, and/or a fuzzy logic controller.

The pre-modified exhaust pressure feedback command 304 and the pre-modified EGR valve feedback command 306 are provided to a non-linear gain matrix 318 which favors one of EGR valve control or exhaust pressure control in response to an EGR valve position 224 and/or an EGR valve command 234. The EGR valve command 234 may be used when the response time of the EGR valve position 224 (i.e. the time lag between a commanded EGR valve position before the EGR valve achieves the commanded position) can be effectively ignored, and depends upon the responsiveness of the EGR valve hardware utilized in a specific system 100 as will be understood to one of skill in the art.

The non-linear gain matrix 318 may further favor one of EGR valve control or exhaust pressure control in response to other operating conditions, including a current charge flow rate 220, a current EGR flow rate 222, and/or a current exhaust pressure 226. The control outputs of the non-linear gain matrix 318 are passed through integrators 320, 322 for integrator control; additionally or alternatively, the control outputs of the non-linear gain matrix 318 may be derivated, or left unadjusted for derivative or proportional control. Other control operations known in the art at blocks 320, 322 may be performed, and several parameters may be acted on simultaneously or combined in the blocks 320, 322 (e.g. a proportional and integral aspect of the feedback commands 244, 246 may be acted upon and combined). The blocks 320, 322 provide an exhaust pressure feedback command 244 and an EGR valve feedback command 246.

Again following the top branch, a feedforward exhaust pressure command 228 is added to determine an exhaust pressure command 250. In the example control loop, an inner loop controller determines an exhaust pressure error term 240 by subtracting the current exhaust pressure 226 from the exhaust pressure command 250, and an exhaust pressure control 326 scheme determines a VGT command in response to the exhaust pressure error term 240.

Following the bottom branch, a feedforward EGR valve position command 230 is added to determine an EGR valve command 234. The VGT command 232 and the EGR valve command 234 are provided to an engine controller (not shown), which may be the same computing device as the controller 104, and a sensors and parameter determination block 328 provides updated values for the current exhaust pressure 226, current charge flow 220, and current EGR flow 222. Any of the operations shown in the control loop of FIGS. 3A and 3B are illustrative, and any similar operations known in the art are contemplated herein. Examples, without limitation, include any alternate methods of mixing a feedforward and feedback command, and alternate sign conventions for determining error terms 236, 238, 240.

The feedforward commands 228, 230 are determined by any method understood in the art, including at least modeling of the system and/or test data from steady state operating points. The feedforward commands 228, 230 are the preferred operating points of the system according to the target charge flow 216 and target EGR fraction 302, and may be selected, without limitation, to provide desired system fuel economy, emissions characteristics, and/or preferred hardware operating positions. In certain embodiments, the feedforward commands 228, 230 may be omitted at certain operating regions of the engine, and/or omitted entirely. Where the feedforward commands 228, 230 are omitted, the system 100 operates only with feedback control according to the feedback commands 244, 246.

Figure 4:
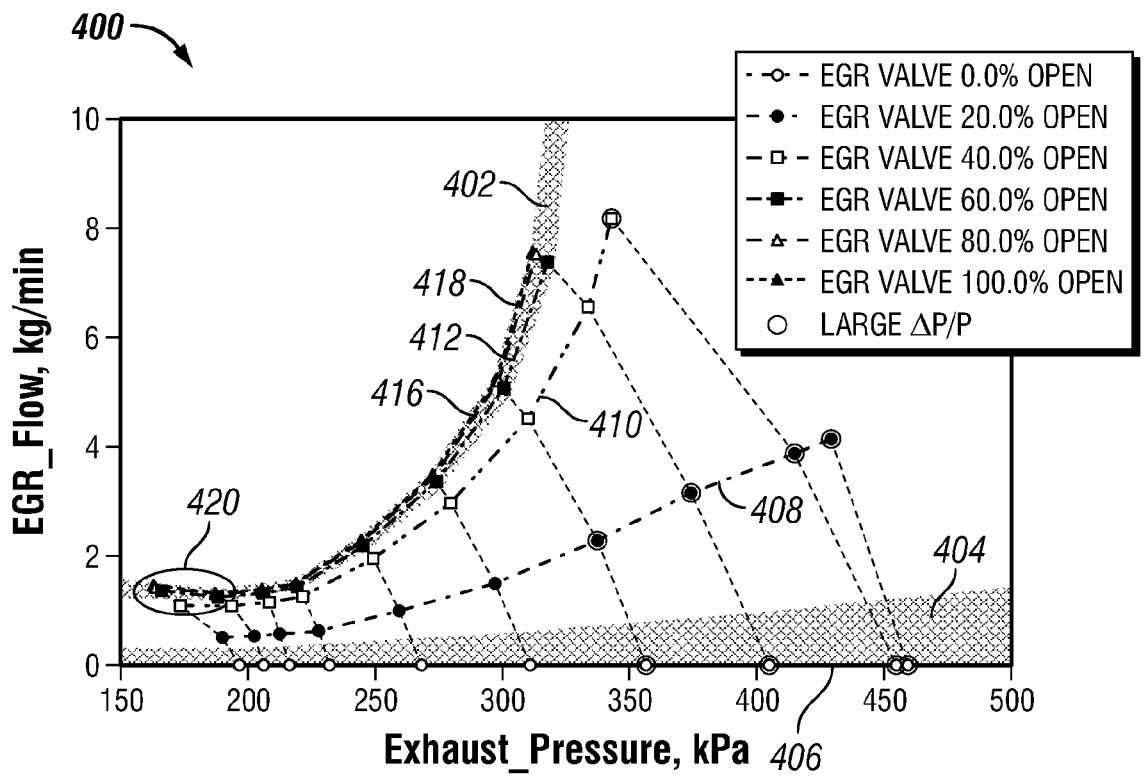
FIG. 4 is an illustration of interactions between EGR flow, exhaust pressure, and EGR valve position.

FIG. 4 is an illustration 400 of interactions between EGR flow 222, exhaust pressure 226, and EGR valve position 224. The data in FIG. 4 is illustrative for one engine configuration only, and will vary with the specific hardware for a given system. However, the general character of the data in the illustration 400 is broadly applicable to many engine configurations having a VGT. The type of data shown in FIG. 4 can be readily generated for a given system by one of skill in the art with the benefit of the disclosures herein, for example by sweeping exhaust pressures at selected fixed EGR positions. The curves represent increasing EGR valve positions 224, including 0% open 406, 20% open 408, 40% open 410, 60% open 412, 80% open 416, and 100% open 418. It is seen in FIG. 4 that at a lower region 404 the VGT has very little effect on the EGR flow rate when the EGR valve is open at very low opening percentages, and that at an upper region 420 the EGR valve position has very little effect on the EGR flow rate. For example, opening the valve from 60% to 100% at an exhaust pressure of about 300 kPa only increase the EGR flow rate from about 5 kg/min to about 5.1 kg/min.

Accordingly, an exemplary non-linear gain matrix 318 favors exhaust pressure based control of the EGR flow when the EGR valve position 224 is at medium to high values, and favors EGR valve position based control of the EGR flow when the EGR valve is at a low value or closed. It is further seen that a portion of some of the curves 412, 416, 418 have a reverse-acting portion, or non-monotonic portion 420. The non-linear gain matrix 318 may be configured, and/or the feedforward exhaust pressure command 228 may be calculated, to manage the non-monotonic portion 420, for example by utilizing EGR valve control in the non-monotonic portion 420, or by open-loop control of the exhaust pressure out of the non-monotonic portion 420 before closed-loop feedback control is resumed. In certain embodiments, the non-linear gain matrix 318 excludes VGT control of the EGR flow rate in the region 404, and excludes EGR valve control of the EGR flow rate in the region 402. In alternate embodiments, the non-linear gain matrix 318 diminishes VGT control of the EGR flow rate in the region 404, and diminishes EGR valve control of the EGR flow rate in the region 402.

Figure 5:
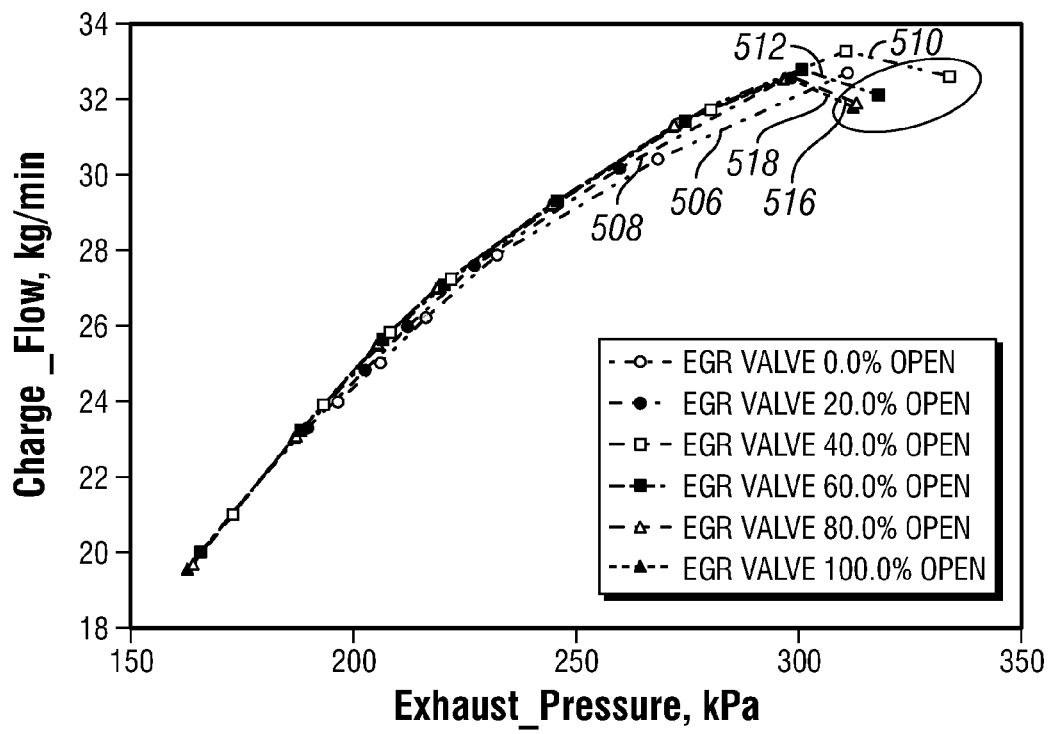
FIG. 5 is an illustration of interactions between charge flow, exhaust pressure, and EGR valve position.

FIG. 5 is an illustration 500 of interactions between charge flow 220, exhaust pressure 226, and EGR valve position 224. The data in FIG. 5 is illustrative for one engine configuration only, and will vary with the specific hardware for a given system. The type of data shown in FIG. 5 can be readily generated for a given system by one of skill in the art with the benefit of the disclosures herein. The curves represent increasing EGR valve positions 224, including 0% open 506, 20% open 508, 40% open 510, 60% open 512, 80% open 516, and 100% open 518. The curves exhibit a maximum and reversal at the right-hand side of the illustration 500. The reversal occurs for very high values of $\Delta P/P$ where, as stated preceding, the $\Delta P$ is a difference between the exhaust pressure and an intake pressure for the engine, and the P is the exhaust pressure.

FIG. 5 illustrates that, for a wide range of exhaust pressure values, the EGR valve position has little effect on the charge flow amount. It is also seen that, at very high values of $\Delta P/P$, or alternatively at very high values of the exhaust pressure, the EGR valve position can affect the charge flow amount. Accordingly, at high $\Delta P/P$ values an exemplary controller 104 further includes EGR valve position into the control of charge flow. In certain embodiments, the EGR valve position is not included in the control of charge flow at any engine operating conditions.

Accordingly, an exemplary non-linear gain matrix 318 favors exhaust pressure control of charge flow at exhaust pressures below a very high exhaust pressure threshold (e.g. below about 300 kPa in the example), and/or at any engine condition except where a very high $\Delta P/P$ is present. The exemplary non-linear gain matrix 318 further includes EGR valve control of the charge flow above the very high exhaust pressure threshold and/or at engine conditions where a very high $\Delta P/P$ is present.

Figure 6A:
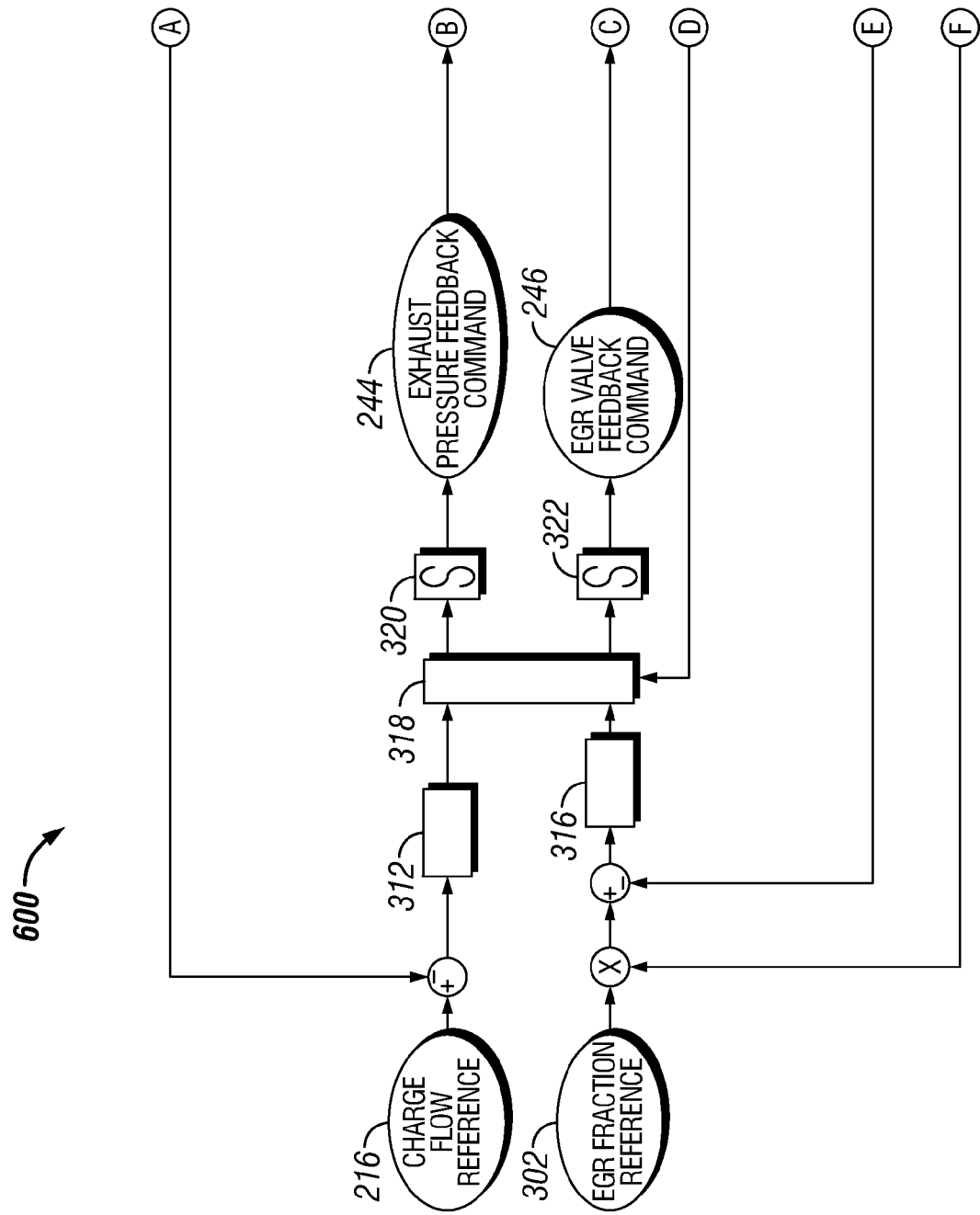
FIG. 6A is a first portion of a schematic illustration of a control loop for controlling intake flow for an internal combustion engine.
Figure 6B:
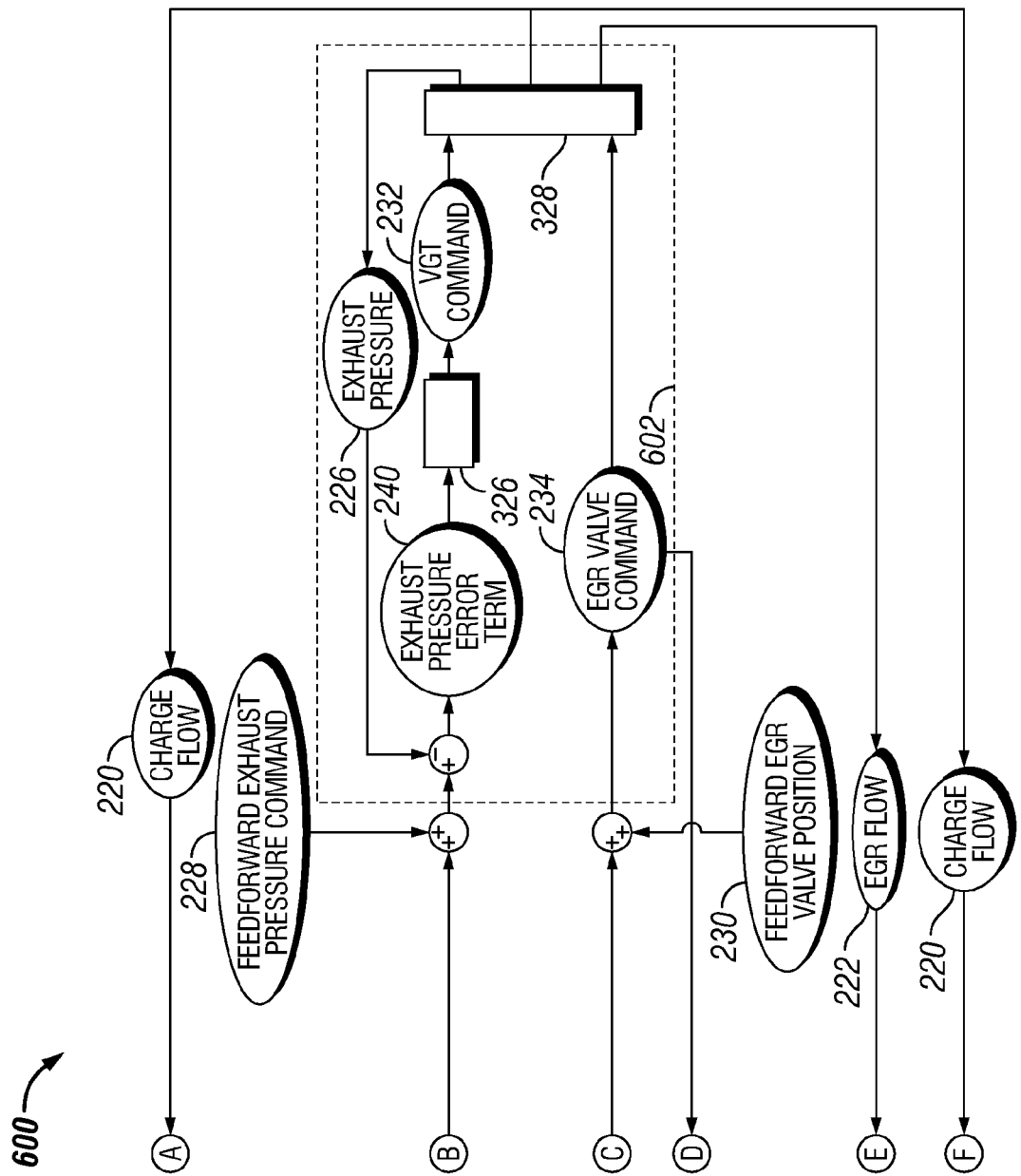
FIG. 6B is a second portion of the schematic illustration of the control loop for controlling intake flow for an internal combustion engine.

FIGS. 6A and 6B combine as another schematic illustration of a control loop 600 for controlling intake flow for an internal combustion engine. The control loop 600 controls a target charge flow 216 and a target EGR fraction 302 using feedback terms of current charge flow 220 and current EGR flow 222. The overall control loop 600, in certain embodiments, is an outer loop control. The control loop 600 includes an inner loop control 602, which controls an exhaust pressure feedback command 244 and an EGR valve feedback command 246 in an inner loop that provides a VGT command 232 with a feedback term of exhaust pressure 226. Thus, in certain embodiments, the controller 104 provides a VGT command 232 in response to the exhaust pressure command 244 and the current exhaust pressure 226 by determining a VGT inner loop command in response to the exhaust pressure error term 240.

As is evident from the figures and text presented above, a variety of embodiments according to the present invention are contemplated.

One exemplary embodiment is a method including operating an internal combustion engine having a variable geometry turbocharger (VGT) and interpreting a target charge flow, a current charge flow, a target exhaust gas recirculation (EGR) flow, and a current EGR flow. The method further includes determining a charge flow error term in response to the current charge flow and the target charge flow, determining an EGR flow error term in response to the target EGR flow and the current EGR flow, interpreting an EGR valve position, and determining an exhaust pressure feedback command and an EGR valve feedback command in response to the charge flow error term, the EGR flow error term, and the EGR valve position. The method further includes interpreting a feedforward exhaust pressure command and a feedforward EGR valve position command, determining an exhaust pressure command in response to the feedforward exhaust pressure command and the exhaust pressure feedback command, and providing a VGT command in response to the exhaust pressure command.

Certain embodiments of the method include one or more of the following described features and operations.

The exemplary method includes determining an exhaust pressure error term in response to the exhaust pressure command and a current exhaust pressure, where providing a VGT command in response to the exhaust pressure command further includes determining a VGT inner loop command in response to the exhaust pressure error term. The method further includes determining the exhaust pressure feedback command and the EGR valve feedback command from a non-linear gain matrix that includes a function of the EGR valve position. The method further includes the non-linear gain matrix favoring EGR valve control of the current EGR flow at low EGR valve positions and low exhaust pressures, and favoring exhaust pressure control of the current EGR flow at high EGR valve positions and high exhaust pressures. The method further includes the non-linear gain matrix favoring exhaust pressure control of the current charge flow. The method further includes the non-linear gain matrix further favoring EGR valve control of the current charge flow at high $\Delta P/P$ values, where the $\Delta P$ is the pressure drop across the engine, or a difference between the current exhaust pressure and a current intake pressure, and where the P is the current exhaust pressure.

Another exemplary embodiment is a system including an internal combustion engine having a variable geometry turbocharger (VGT) and an intake manifold that provides a charge flow to the internal combustion engine, the charge flow comprising fresh air flow combined with exhaust gas recirculation (EGR) flow, the intake manifold positioned downstream of the VGT on an intake side. The system further includes an exhaust manifold positioned upstream of the VGT on an exhaust side and a controller structured to perform certain operations for controlling the intake flow with exhaust gas pressure. The controller interprets a target charge flow, a current charge flow, a target exhaust gas recirculation (EGR) flow, a current EGR flow, and an EGR valve position. The controller determines a charge flow error term in response to the current charge flow and the target charge flow, and an EGR flow error term in response to the target EGR flow and the current EGR flow. The controller further determines an exhaust pressure feedback command and an EGR valve feedback command in response to the charge flow error term, the EGR flow error term, and the EGR valve position. The controller further interprets a feedforward exhaust pressure command and a feedforward EGR valve position command, determines an exhaust pressure command in response to the feedforward exhaust pressure command and the exhaust gas feedback command, and provides a VGT command in response to the exhaust pressure command.

Yet another exemplary embodiment is an apparatus including a reference module that interprets a target charge flow and a target exhaust gas recirculation (EGR) flow. The apparatus includes an operating conditions module that interprets a current charge flow, a current EGR flow, and an EGR valve position. The apparatus further includes an error determination module that determines a charge flow error term in response to the current charge flow and the target charge flow, and determines an EGR flow error term in response to the target EGR flow and the current EGR flow. The apparatus further includes a feedback module that determines an exhaust pressure feedback command and an EGR valve feedback command in response to the charge flow error term, the EGR flow error term, and the EGR valve position. In certain embodiments, the feedback module determines the exhaust pressure feedback command and an EGR valve feedback command in response to an EGR valve command instead of, or in addition to, the EGR valve position. The apparatus further includes a feedforward module that interprets a feedforward exhaust pressure command and a feedforward EGR valve position command, and an inner loop control module that determines an exhaust pressure command in response to the feedforward exhaust pressure command and the exhaust pressure feedback command. The inner loop control module further provides a VGT command in response to the exhaust pressure command. The apparatus further includes an EGR valve command module that determines an EGR valve command in response to the EGR valve feedback command and the feedforward EGR valve position command.

Certain embodiments of the apparatus include one or more of the following described features and operations.

The apparatus further includes the error determination module further determining an exhaust pressure error term in response to the exhaust pressure command and a current exhaust pressure, and the inner loop control module further determining a VGT inner loop command in response to the exhaust pressure error term, and providing the VGT command further in response to the VGT inner loop command. The feedback module further determines the exhaust pressure feedback command and EGR valve feedback command from a non-linear gain matrix that includes a function of the EGR valve position. In certain embodiments, the non-linear gain matrix favors EGR valve control of the current EGR flow at low flow rates and low EGR valve positions, and exhaust pressure control of the current EGR flow at high flow rates and high EGR valve positions. In certain embodiments, the non-linear gain matrix favors exhaust pressure control of the current charge flow. In certain further embodiments, the non-linear gain matrix further favors EGR valve control of the current charge flow at high ΔP/P values, where the ΔP is a difference between the current exhaust pressure and a current intake pressure, and where the P is the current exhaust pressure.

Another exemplary embodiment is a method including operating an internal combustion engine having a variable geometry turbocharger (VGT), interpreting a target charge flow, a current charge flow, a target exhaust gas recirculation (EGR) flow, and a current EGR flow, and determining a charge flow error term in response to the current charge flow and the target charge flow. The method further includes determining an EGR flow error term in response to the target EGR flow and the current EGR flow, and determining an exhaust pressure feedback command in response to the charge flow error term and the EGR flow error term. The method further includes interpreting a feedforward exhaust pressure command, and determining an exhaust pressure command in response to the feedforward exhaust pressure command and the exhaust pressure feedback command. The exemplary method further includes providing a VGT command in response to the exhaust pressure command.

A further embodiment of the method includes interpreting an EGR valve position, where determining the exhaust pressure feedback command is further in response to the EGR valve position. A further method includes determining an EGR valve feedback command in response to the charge flow error term, the EGR flow error term, and the EGR valve position. In certain embodiments, the method includes providing a response to the EGR flow error term that is primarily weighted to the exhaust pressure feedback command when the EGR valve position is above 40% open, and that is primarily weighted to the EGR valve feedback command when the EGR valve position is below 40% open. Alternatively, the method includes providing a response to the EGR flow error term that is primarily weighted to the exhaust pressure feedback command when the EGR valve position is above 60% open, and that is primarily weighted to the EGR valve feedback command when the EGR valve position is below 60% open.

In certain embodiments, the method includes determining the exhaust pressure feedback command and the EGR valve feedback command from a non-linear gain matrix that is a function of the EGR valve position. In a further embodiment, the non-linear gain matrix favors EGR valve control of the current EGR flow at low EGR valve positions and low exhaust pressures, and exhaust pressure control of the current EGR flow at high EGR valve positions and high exhaust pressures. Additionally or alternatively, the non-linear gain matrix favors exhaust pressure control of the current charge flow. In certain embodiments, the non-linear gain matrix further favors EGR valve control of the current charge flow at high ΔP/P values, wherein the ΔP is a difference between the current exhaust pressure and a current intake pressure, and wherein the P is the current exhaust pressure. In certain embodiments, the method includes determining an exhaust pressure error term in response to the exhaust pressure command and a current exhaust pressure, where providing a VGT command in response to the exhaust pressure command further includes determining a VGT inner loop command in response to the exhaust pressure error term.

Yet another exemplary embodiment is a system including an internal combustion engine having a variable geometry turbocharger (VGT), an intake manifold that provides a charge flow to the internal combustion engine, where the charge flow includes fresh air flow combined with exhaust gas recirculation (EGR) flow, and where the intake manifold is positioned downstream of the VGT on an intake side. The system further includes an exhaust manifold positioned upstream of the VGT on an exhaust side, and a controller including modules structured to functionally execute operations for controlling charge flow and/or EGR flow for the engine.

The exemplary controller includes a reference module that interprets a target charge flow, and a target exhaust gas recirculation (EGR) flow. The controller further includes an operating conditions module that interprets a current charge flow and a current EGR flow, and an error determination module that determines a charge flow error term in response to the current charge flow and the target charge flow. The error determination module further determines an EGR flow error term in response to the target EGR flow and the current EGR flow. The controller further includes a feedback module that determines an exhaust pressure feedback command in response to the charge flow error term and the EGR flow error term, and a feedforward module that interprets a feedforward exhaust pressure command. The exemplary controller further includes an inner loop control module that determines an exhaust pressure command in response to the feedforward exhaust pressure command and the exhaust pressure feedback command, and that provides a VGT command in response to the exhaust pressure command. The VGT is responsive to the VGT command.

The exemplary system further includes an EGR valve disposed between the VGT and the intake manifold, where the operating conditions module further determines an EGR valve position, and where the feedback module further determines the exhaust pressure feedback command in response to the EGR valve position. An exemplary system further includes the feedback module determining an EGR valve feedback command in response to the charge flow error term, the EGR flow error term, and the EGR valve position, where the feedforward module further determines a feedforward EGR valve position command. The exemplary controller further includes an EGR valve command module that determines an EGR valve command in response to the EGR valve feedback command and the feedforward EGR valve position command, and the EGR valve is responsive to the EGR valve command.

A further embodiment of the system includes the feedback module further determining the exhaust pressure feedback command and EGR valve feedback command from a non-linear gain matrix that is a function of the EGR valve position. In certain embodiments, the non-linear gain matrix favors EGR valve control of the current EGR flow at low flow rates and low EGR valve positions, and favors exhaust pressure control of the current EGR flow at high flow rates and high EGR valve positions. In certain embodiments, the non-linear gain matrix favors exhaust pressure control of the current charge flow. In certain further embodiments, the non-linear gain matrix further favors EGR valve control of the current charge flow at high $\Delta P/P$ values, where the $\Delta P$ is a difference between the current exhaust pressure and a current intake pressure, and wherein the P is the current exhaust pressure.

In certain embodiments, the system includes the error determination module further determining an exhaust pressure error term in response to the exhaust pressure command and a current exhaust pressure. The inner loop control module further determines a VGT inner loop command in response to the exhaust pressure error term, and provides the VGT command further in response to the VGT inner loop command.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine having a variable geometry turbocharger (VGT);
   interpreting a target charge flow, a current charge flow, a target exhaust gas recirculation (EGR) flow, and a current EGR flow;
   determining a charge flow error term in response to the current charge flow and the target charge flow;
   determining an EGR flow error term in response to the target EGR flow and the current EGR flow;
   determining an exhaust pressure feedback command in response to the charge flow error term and the EGR flow error term;
   interpreting a feedforward exhaust pressure command;
   determining an exhaust pressure command in response to the feedforward exhaust pressure command and the exhaust pressure feedback command; and
   providing a VGT command in response to the exhaust pressure command.

2. The method of claim 1, further comprising interpreting an EGR valve position, and wherein the determining the exhaust pressure feedback command is further in response to the EGR valve position.

3. The method of claim 2, further comprising determining an EGR valve feedback command in response to the charge flow error term, the EGR flow error term, and the EGR valve position.

4. The method of claim 3, further comprising providing a response to the EGR flow error term that is primarily weighted to the exhaust pressure feedback command when the EGR valve position is above 40% open, and that is primarily weighted to the EGR valve feedback command when the EGR valve position is below 40% open.

5. The method of claim 3, further comprising providing a response to the EGR flow error term that is primarily weighted to the exhaust pressure feedback command when the EGR valve position is above 60% open, and that is primarily weighted to the EGR valve feedback command when the EGR valve position is below 60% open.

6. The method of claim 3, wherein the exhaust pressure feedback command and the EGR valve feedback command are determined from a non-linear gain matrix comprising a function of the EGR valve position.

7. The method of claim 6, wherein the non-linear gain matrix favors EGR valve control of the current EGR flow at low EGR valve positions and low exhaust pressures, and exhaust pressure control of the current EGR flow at high EGR valve positions and high exhaust pressures.

8. The method of claim 7, wherein the non-linear gain matrix favors exhaust pressure control of the current charge flow.

9. The method of claim 8, wherein the non-linear gain matrix further favors EGR valve control of the current charge flow at high $\Delta P/P$ values, wherein the $\Delta P$ is a difference between the current exhaust pressure and a current intake pressure, and wherein the P is the current exhaust pressure.

10. The method of claim 1, further comprising determining an exhaust pressure error term in response to the exhaust pressure command and a current exhaust pressure, wherein providing a VGT command in response to the exhaust pressure command further comprises determining a VGT inner loop command in response to the exhaust pressure error term.

11. An apparatus, comprising:
a reference module structured to interpret a target charge flow, and a target exhaust gas recirculation (EGR) flow;
an operating conditions module structured to interpret a current charge flow and a current EGR flow;
an error determination module structured to determine a charge flow error term in response to the current charge flow and the target charge flow, and to determine an EGR flow error term in response to the target EGR flow and the current EGR flow;
a feedback module structured to determine an exhaust pressure feedback command in response to the charge flow error term and the EGR flow error term;
a feedforward module structured to interpret a feedforward exhaust pressure command; and
an inner loop control module structured to determine an exhaust pressure command in response to the feedforward exhaust pressure command and the exhaust pressure feedback command and to provide a VGT command in response to the exhaust pressure command.

12. The apparatus of claim 11, wherein the operating conditions module is further structured to determine an EGR valve position, and wherein the feedback module is further structured to determine the exhaust pressure feedback command in response to the EGR valve position.

13. The apparatus of claim 12, wherein the feedback module is further structured to determine an EGR valve feedback command in response to the charge flow error term, the EGR flow error term, and the EGR valve position;
wherein the feedforward module is further structured to determine an EGR feedforward EGR valve position; the apparatus further comprising an EGR valve command module structured to determine an EGR valve command in response to the EGR valve feedback command and the feedforward EGR valve position command.

14. The apparatus of claim 13, wherein the feedback module is further structured to determine the exhaust pressure feedback command and EGR valve feedback command from a non-linear gain matrix comprising a function of the EGR valve position.

15. The apparatus of claim 14, wherein the non-linear gain matrix favors EGR valve control of the current EGR flow at low flow rates and low EGR valve positions, and exhaust pressure control of the current EGR flow at high flow rates and high EGR valve positions.

16. The apparatus of claim 14, wherein the non-linear gain matrix favors exhaust pressure control of the current charge flow.

17. The apparatus of claim 16, wherein the non-linear gain matrix further favors EGR valve control of the current charge flow at high $\Delta P/P$ values, wherein the $\Delta P$ is a difference between the current exhaust pressure and a current intake pressure, and wherein the P is the current exhaust pressure.

18. The apparatus of claim 11, wherein the error determination module is further structured to determine an exhaust pressure error term in response to the exhaust pressure command and a current exhaust pressure, and wherein the inner loop control module is further structured to determine a VGT inner loop command in response to the exhaust pressure error term, and to provide the VGT command further in response to the VGT inner loop command.

19. A system, comprising:
an internal combustion engine having a variable geometry turbocharger (VGT);
an intake manifold that provides a charge flow to the internal combustion engine, the charge flow comprising fresh air flow combined with exhaust gas recirculation (EGR) flow, the intake manifold positioned downstream of the VGT on an intake side;
an exhaust manifold positioned upstream of the VGT on an exhaust side;
a controller, comprising:
a reference module structured to interpret a target charge flow, and a target exhaust gas recirculation (EGR) flow;
an operating conditions module structured to interpret a current charge flow and a current EGR flow;
an error determination module structured to determine a charge flow error term in response to the current charge flow and the target charge flow, and to determine an EGR flow error term in response to the target EGR flow and the current EGR flow;
a feedback module structured to determine an exhaust pressure feedback command in response to the charge flow error term and the EGR flow error term;
a feedforward module structured to interpret a feedforward exhaust pressure command; and
an inner loop control module structured to determine an exhaust pressure command in response to the feedforward exhaust pressure command and the exhaust pressure feedback command and to provide a VGT command in response to the exhaust pressure command; and
wherein the VGT is responsive to the VGT command.

20. The system of claim 19, further comprising an EGR valve disposed between the VGT and the intake manifold, wherein the operating conditions module is further structured to determine an EGR valve position, and wherein the feedback module is further structured to determine the exhaust pressure feedback command in response to the EGR valve position.

21. The system of claim 20, wherein the feedback module is further structured to determine an EGR valve feedback command in response to the charge flow error term, the EGR flow error term, and the EGR valve position; wherein the feedforward module is further structured to determine a feedforward EGR valve position command; wherein the controller further comprises an EGR valve command module structured to determine an EGR valve command in response to the EGR valve feedback command and the feedforward EGR valve position command; and wherein the EGR valve is responsive to the EGR valve command.

22. The system of claim 21, wherein the feedback module is further structured to determine the exhaust pressure feedback command and EGR valve feedback command from a non-linear gain matrix comprising a function of the EGR valve position.

23. The system of claim 22, wherein the non-linear gain matrix favors EGR valve control of the current EGR flow at low flow rates and low EGR valve positions, and exhaust pressure control of the current EGR flow at high flow rates and high EGR valve positions.

24. The system of claim 22, wherein the non-linear gain matrix favors exhaust pressure control of the current charge flow.

25. The system of claim 24, wherein the non-linear gain matrix further favors EGR valve control of the current charge flow at high $\Delta P/P$ values, wherein the $\Delta P$ is a difference between the current exhaust pressure and a current intake pressure, and wherein the P is the current exhaust pressure.

26. The system of claim 19, wherein the error determination module is further structured to determine an exhaust pressure error term in response to the exhaust pressure command and a current exhaust pressure, and wherein the inner loop control module is further structured to determine a VGT inner loop command in response to the exhaust pressure error term, and to provide the VGT command further in response to the VGT inner loop command.

* * * * *